Dec. 1, 1970  L. A. DE SCHAMPHELAERE ET AL  3,543,597
DEVICE FOR THE POSITIONING CONTROL OF AN ENDLESS BELT
Filed Oct. 26, 1967  3 Sheets-Sheet 1

INVENTOR
Lucien A. De Schamphelaere
Gentil De Blende
BY
Watson, Cole, Grindle + Watson
ATTORNEYS

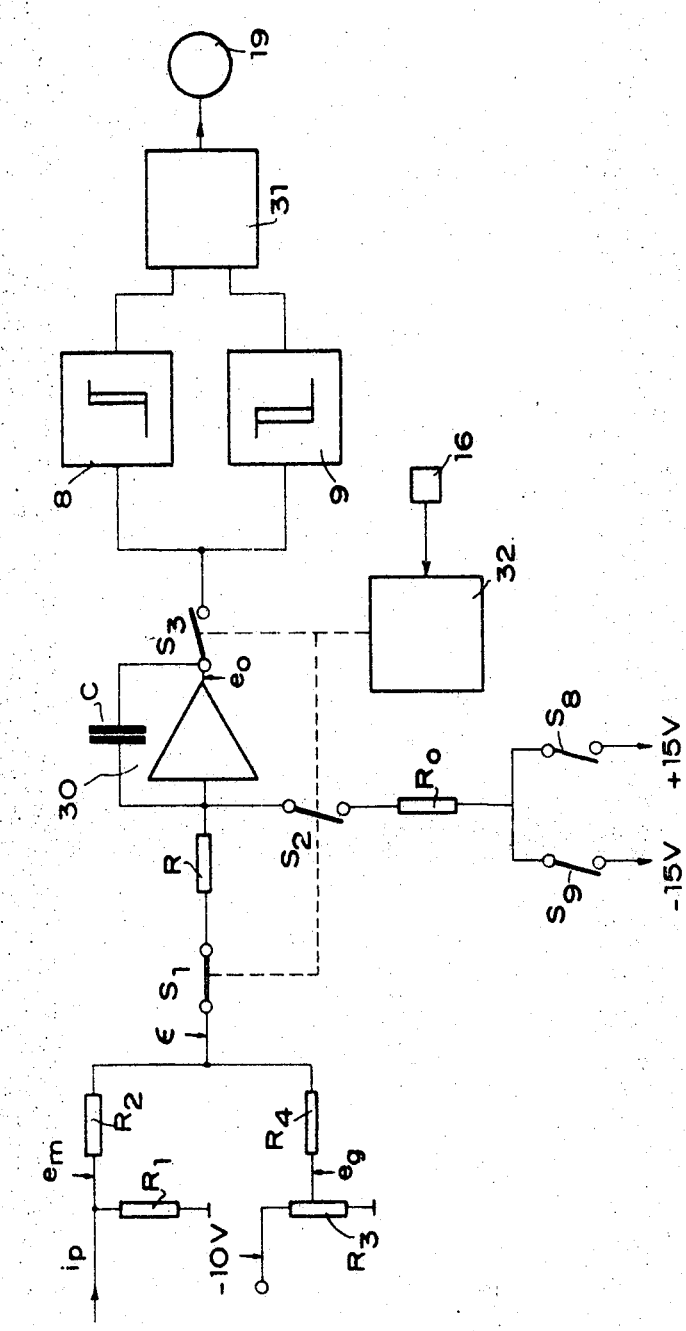

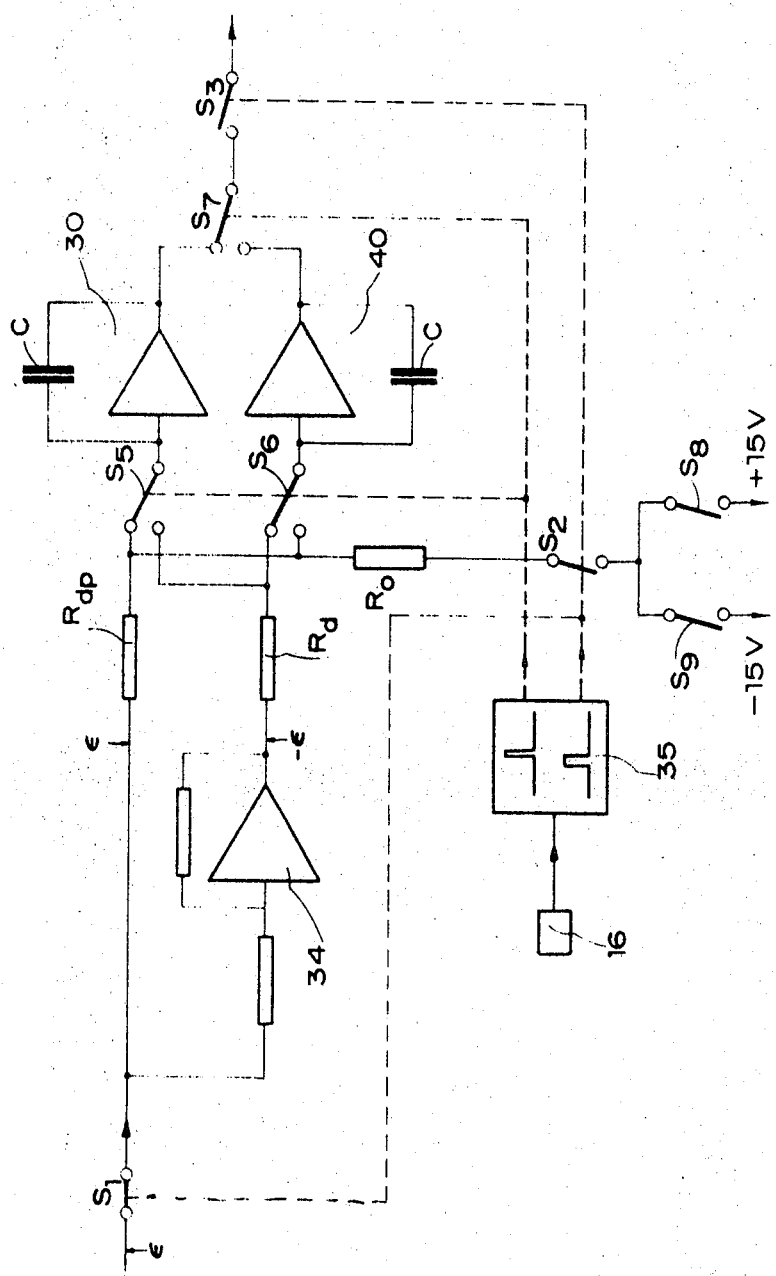

United States Patent Office 3,543,597
Patented Dec. 1, 1970

3,543,597
DEVICE FOR THE POSITIONING CONTROL OF AN ENDLESS BELT
Lucien A. Amede De Schamphelaere, Edegem, and Gentil De Blende, Wilrijk, Belgium, assignors to Gevaert-Agfa N.V., Mortsel, Belgium, a Belgian company
Filed Oct. 26, 1967, Ser. No. 679,580
Claims priority, application Belgium, Oct. 26, 1966, 46,175
Int. Cl. F16h 7/18
U.S. Cl. 74—241                 12 Claims

ABSTRACT OF THE DISCLOSURE

Apparatus for controlling the lateral running position of an endless belt by adjusting the position of a belt correcting member, i.e. as by adjusting the axis of a guide roll. Deviations in the position of the belt edge are detected and are averaged over a given period, such as the period of one belt revolution, and the position of the belt correcting member is adjusted in accordance with such average deviation plus the rate of change of such average deviation, which can be determined, for example, by subtracting two successive average deviations.

---

The invention relates to a device for the positioning control of an endless metal belt. More particularly the invention relates to a device for controlling the position, more precisely the lateral position, of a polished endless belt which is used in the film industry for the production of films as a temporary support for a film forming solution cast thereon.

The positioning of film and other webs is done in a known way by means of a device which comprises an edge detector producing a position deviation signal which is a function of the film edge deviation from its intended position, a controller which is fed by the said position deviation signal and the output of which controls a correcting member which modifies the position of the web.

The edge detector can be a pneumatic, a photo-electric, a capacitive or an inductive sensing means. The correcting member is usually a roller over which the web is passed and the position of which, hereinafter referred to as the skew position, is changed whereby the web will move laterally into the desired direction.

These devices, in which the deviation signal directly controls the correction of the position, are not very suited for positioning endless belts, more particularly endless belts which are used in the film industry as mentioned hereinbefore, because the edges of the belts are irregularly shaped.

For instance, the edges of belts with a length of 50 m. and a width of 1.25 m. show deviations of several mm. in practice. When the lateral position of such belts will be controlled by means of the known devices, the position of the belt will be corrected in a continuous way since the edge detector is detecting the edge irregularities so that the belt will swing to and fro.

The known technique comprising the use of a dead zone during which the deviations are but corrected above a distinct value does not allow an accurate positioning of the belt.

According to the present invention a device for the positioning control of an endless belt comprises an edge detector which produces a position deviation signal, a correcting member for controlling the belt position, and a controller which receives the position deviation signal and controls the correcting member, said controller including means for defining the average position deviation of the belt edge and means for defining the rate at which the average position deviation changes, so that the correction signal of the controller controlling the correcting member depends on the said average position deviation and on the rate of change of said average position deviation.

By "average" position deviation of the belt edge in the present description is meant the average defined over one or nearly one revolution or over a number of revolutions of the belt.

The average position deviation of the belt edge can be obtained by integrating the momentary signals of the position deviation over one or nearly one revolution of the belt or over a number of such revolutions.

For clearness sake, it is always referred to a period of one revolution in the present description and claims, but it is recalled here that for purposes of this invention also a period of nearly one revolution or a period of a number of revolutions of the belt are contemplated thereby.

The rate at which the average position deviation changes is determined according to a particular embodiment of the present invention by subtracting two subsequent integrated signals of the position deviation from one another.

With reference to the accompanying drawings the invention will now be described by way of example:

FIG. 3 is a block diagram of the electric circuit for defining the average position deviation.

FIG. 4 is a block diagram of the electric circuit for defining the average position deviation and the rate at which the average position deviation changes.

Figure 1:
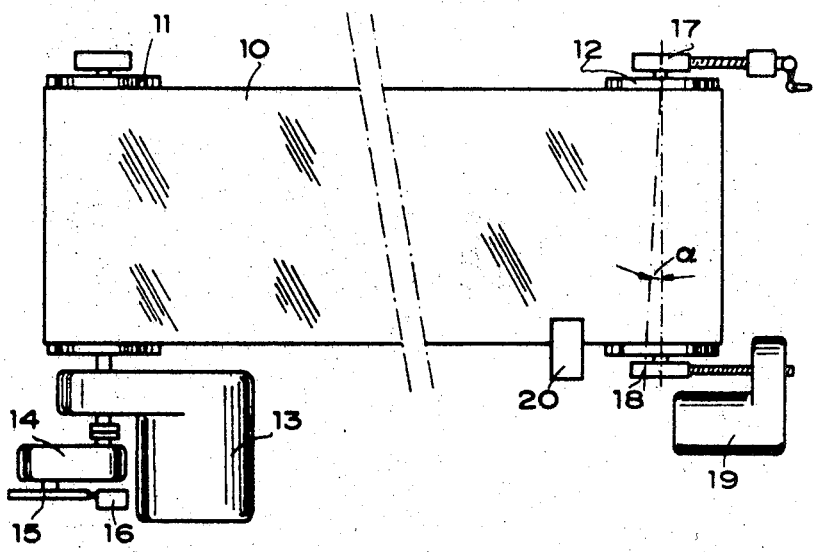
FIG. 1 is a diagrammatic view of a device with an endless belt.

An endless metal belt 10 is carried by two rollers 11 and 12 in the apparatus illustrated in FIG. 1. Intermediate rollers which are required for supporting the belt between these two rollers have been omitted in the drawings since they are not necessary for the understanding of the present embodiment.

The roller 11 is driven by a motor 13 with built-in reduction gear. The shaft of the roller 11 is also coupled with a second reduction gear casing 14 the proportion of which has been chosen in such a way that a cam 15 performs one revolution for one complete revolution of the endless belt 10. The cam 15 is provided with a notch which closes the revolution switch 16 for a short period at each revolution.

The roller 12 is adjustable so that its axis may form an angle $\alpha$ with respect to the transverse direction of the belt 10. For clearness sake this angle $\alpha$ has been illustrated in an exaggerated way in the figure. The adjustment of the roller 12 may be done manually at one side by means of a crank which makes a threaded spindle rotate so that the position of the shaft bearing 17 is changed, whereas the shaft bearing 18 at the opposite side of the roller is displaced by means of a servomotor 19.

Figure 2:
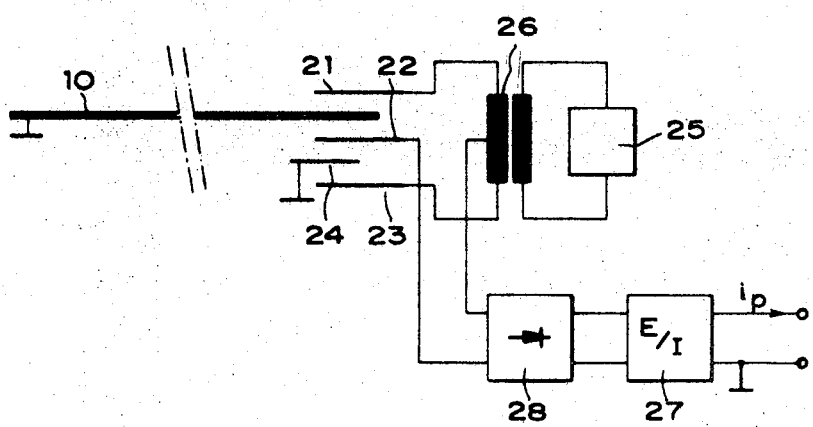
FIG. 2 is the electric circuit of the edge detector.

The lateral position of the belt is measured by means of the edge detector 20. The edge detector and its electric circuit are represented in FIG. 2. The edge detector is of the capacitive kind and mainly comprises 3 electrodes 21, 22 and 23 in the form of small metal plates which are electrically insulated and spaced at mutually equal distances.

The endless metal belt 10, which is represented in cross-sectional view, moves with one marginal part between the plates 21 and 22. A flat reference electrode 24 which can be displaced in horizontal direction, is provided between the plates 22 and 23.

The electrode 24 is electrically grounded whereas according to the nature of the construction of the device the metal belt 10 is grounded too.

It is clear that the belt 10 and the reference-electrode 24 constitute a screening between the electrodes of two capacitors which form a bridge circuit together with the secondary windings of a transformer 26. The bridge circuit is fed by the oscillator 25 and the output A.C. voltage of the bridge circuit is phase-sensitive rectified in the rectifier 28. Thereafter the obtained D.C. voltage is converted into a D.C. current $i_p$ in the voltage (E) to current (I) converter 27.

In the device according to the present embodiment the frequency of the oscillator 25 amounted to 1000 cycles and a D.C. current $i_p$ ranging from 0 to 20 ma. was obtained at the output of the converter 27 for a corresponding belt displacement of 10 cm. (from + to −5 cm. with respect to the reference position).

The output signal of the edge detector is connected to a controller which treats this signal in a defined way in order to produce a control signal for controlling the correcting member, constituted in this case by the roller 12 and the motor 19.

The controller comprises means for defining the average position deviation of the belt edge and the rate of the changes of such average position deviations.

The device for defining the average position deviation is represented in FIG. 3. It comprises a resistor $R_1$ whereby the output current $i_p$ of the edge detector is converted into a voltage $e_m$, a potentiometer $R_3$ by means of which the voltage of a D.C. voltage source, in the present case a voltage of −10 v., can be adjusted to the desired voltage $e_g$, and the resistors $R_2$ and $R_4$ so that the voltages $e_g$ and $e_m$ are compared with each other and the difference voltage $\epsilon = e_m - e_g$ is obtained. Further an integrator 30 is provided, comprising an operational amplifier with capacitor-feedback C, two triggers 8 and 9 consisting of a conventional Schmitt-trigger circuit, a control circuit 31 and a switching unit 32 which is controlled by the switch 16 and which actuates the contacts $S_1$, $S_2$ and $S_3$.

The device is operated as follows.

During the revolution of the endless belt the voltage $e_m$ which is a function of the momentary deviation of the belt is continuously compared with the desired voltage $e_g$. The difference voltage $\epsilon$ which gives the momentary position deviation is integrated by the integrator 30. The output signal of the integrator after one belt revolution is represented by:

$$e_o = -\frac{1}{RC}\int^T \epsilon \cdot dt = -\frac{T}{RC}\epsilon_g \quad (1)$$

wherein:

$e_o$ stands for the output voltage of the integrator with time constant RC after one revolution, T stands for the period of one belt revolution, $\epsilon$ stands for $e_m - e_g$, being the momentary position deviation, $\epsilon_g$ stands for the average position deviation over one belt revolution.

The signal $e_o$ equals zero when the belt has the desired position and will differ from zero as the average value of the measured signal $e_m$ deviates from the desired value $e_g$ during one revolution.

When the belt has performed one complete revolution the switch 16 is closed for a short while. By the signal of the switch 16 the switching unit 32 is actuated. This unit is provided with a time switch (not represented) which changes over the contacts $S_1$, $S_2$ and $S_3$ during a defined time.

By the opening of $S_1$ the integrator 30 is disconnected from the momentary deviation voltage $\epsilon$.

By the closing of $S_3$ the integrated voltage $e_o$ is applied to the triggers 8 and 9. According to the polarity of the voltage $e_o$ one of the triggers 8 or 9 is changed over. Through the control circuit 31 the correction motor 19 is energized in the desired direction in order to correct the belt deviation.

The changing over of one of the triggers 8 or 9 causes one of the corresponding contacts $S_8$ or $S_9$ to close. Thereby a voltage of the appropriate polarity (+ or −15 v.) is applied over $R_o$ and also over the meanwhile closed contact $S_2$ to the input of the integrator in order to make the output voltage drop to zero. When this voltage has become zero, the trigger is changed over again to its normal position so that the motor 19 stops.

The time during which one trigger is changed over, and thus the correction motor 19 is running in the correcting sense, is a function of the output voltage $e_o$ of the charged integrator, and consequently of the average position deviation.

It will be understood that the time constant $R_oC$ must be sufficiently small to permit the integrator to be completely discharged during the time the contacts $S_1$, $S_2$ and $S_3$ are changed over by the switching unit 32, and at the largest possible signal $e_o$ of the average position deviation to be expected.

When the switching unit 32 makes the contacts $S_1$ to $S_3$ return in the position as illustrated, the measurement of the average position deviation of the next revolution is started.

In the device according to the present embodiment the time during which the contacts $S_1$, $S_2$ and $S_3$ have been changed over amounted to 5% of the time of one belt revolution.

If the device for positioning the endless belt would operate as repersented in FIG. 3, the results would be very unsatisfactory because the belt would still be subject to excessive swinging. This unsatisfactory operation is explained as follows.

When a modification in the skew position of one of the rollers occurs, e.g. due to changes in temperature, the endless belt deviates to one side. During one revolution the average position deviation is defined whereafter the correction motor 19 will run in the correcting sense in order to reduce the deviation. If during the following revolution the deviation is still directed to the same side, the correction motor 19 will run once more in the same direction as before whereby the skew position $\alpha$ of the roller 12 increases still more. When finally the average position deviation of the belt is equal to zero, then the skew position of the roller 12 at that moment is responsible for the continuance of the correcting action, so that the belt will deviate to the other side. At the next correcting action the correction motor 19 starts running in the reverse sense, so that finally the belt will deviate to the first side.

The swinging of the belt occurs because the circuit comprises two integrating factors, viz. the position of the belt is the integral of the skew position (angle $\alpha$) of the roller 12 and the angle $\alpha$ itself is the time integral of the output signal of the controller considered over a great number of belt revolutions.

The first integral is explained by the fact that at a defined skew position of the roller 12 the belt will execute a helical movement around the roller during one revolution, since the roller 12 performs a relatively great number of revolutions during one belt revolution.

The second integral is explained by the fact that the correction motor integrates the correction signals of the controller considered over a great number of belt revolutions.

By introducing in the controller a differentiating action a very satisfactory operation of the positioning device is obtained.

Such a differentiating action is formed by the derivative of the average position deviation. A signal proportional to this derivative is obtained by subtracting two subsequent integrated position deviation signals from one another, so that after two belt revolutions an output signal is obtained which is a function of the rate at which the belt is deviating.

In practice such an output signal can be obtained by discharging the integrator only after two belt revolutions and by reversing after the first belt revolution the polarity of the momentary deviation signal $\epsilon$ which is applied to the integrator. The output signal is then represented by:

$$e_o = -\frac{1}{RC}\int_0^T \epsilon \cdot dt - \frac{1}{RC}\int_T^{2T} -\epsilon \cdot dt$$

$$e_o = \frac{1}{RC}(\epsilon_{g_{i+1}} - \epsilon_{g_i}) \quad (2)$$

wherein:

$e_o$ stands for the output voltage,
T stands for the period of one belt revolution,
$\epsilon$ stands for the momentary position deviation,
$\epsilon_{g_i}$ stands for the average position deviation over an arbitrary belt revolution $i$,
$\epsilon_{g_{i+1}}$ stands for the average position deviation over the next belt revolution $i+1$.

The desired proportionally differentiating action is realized by performing two subsequent charges with different time constants $(RC)_d$ and $(RC)_{dp}$.

In a simple way these two different time constants are obtained by maintaining the capacity C of the integrator 30 to a constant value and by replacing the resistor R for the first belt revolution by a resistor $R_d$ and by replacing the resistor R for the second belt revolution by a resistor $R_{dp}$ which represents the parallel connection of the resistor $R_d$ with a resistor $R_p$, so that:

$$\frac{1}{R_{dp}} = \frac{1}{R_d} + \frac{1}{R_p}$$

and the time constant is given by:

$$\frac{1}{(RC)_{dp}} = \frac{1}{(RC)_d} + \frac{1}{(RC)_p} \quad (3)$$

The output signal is given by:

$$e_o = -\frac{1}{(RC)_d}\int_0^T \epsilon \cdot dt - \frac{1}{(RC)_{dp}}\int_T^{2T} -\epsilon \cdot dt \quad (4)$$

and after replacing $1/(RC)_{dp}$ by (3):

$$e_o = -\frac{1}{(RC)_d}\int_0^T \epsilon \cdot dt + \frac{1}{(RC)_d}\int_T^{2T} \epsilon \cdot dt + \frac{1}{(RC)_p}\int_T^{2T} \epsilon \cdot dt$$

$$e_o = \frac{T}{(RC)_d}(\epsilon_{g_{i+1}} - \epsilon_{g_i}) + \frac{T}{(RC)_p}\epsilon_{g_{i+1}} \quad (5)$$

The Equation 5 contains a component which is proportional to the rate of the position deviation, viz.

$$\frac{T}{(RC)_d}(\epsilon_{g_{i+1}} - \epsilon_{g_i})$$

and a component which is proportional to the absolute value of the position deviation, viz.

$$\frac{T}{(RC)_p}(\epsilon_{g_{i+1}})$$

The relative values of $R_d$ and $R_p$ define the relative value of the differentiating, respectively of the proportional action at constant capacity C.

From the description of the operation of the device it appears that a correction signal is only available after every two belt revolutions.

It is much more interesting to proceed to the correction after each revolution. For this reason the controller preferably comprises two integrators the charging cycles of which are shifted over a period of one belt revolution.

The complete controller is represented in FIG. 4. In this figure the elements having the same function as the elements represented in FIG. 3, are indicated by the same numerals.

The controller comprises a switching unit 35, which is controlled by the revolution switch 16, but which now controls two sets of contacts, viz. the contacts $S_1$, $S_2$ and $S_3$ and the change-over contacts $S_5$, $S_6$ and $S_7$, a reversing unit 34 for reversing the polarity of the momentary position deviation signal, which in a known way consists of an operational amplifier with resistor feedback, two identical integrators 30 and 40 and the resistors $R_d$ and $R_{dp}$ being different from each other. The controller is also provided after the contact $S_3$, with two Schmitt-triggers 8 and 9 and a control circuit 31 which are not indicated and which correspond with the elements represented in FIG. 3.

The controller is operated as follows:

During the revolution of the belt the voltage $\epsilon$, which represents the momentary position deviation and which is obtained in the same way as illustrated in FIG. 3, is integrated by the integrator 30, whereas the voltage $-\epsilon$ which is obtained by means of the unit 34 is integrated by the integrator 40. After one revolution the revolution switch 16 is closed for a short while. Thereby the switching unit 35 is actuated.

By a nonrepresented built-in time circuit the contacts $S_1$, $S_2$ and $S_3$ are changed over for a defined period, represented by the first (lower) impulse in the unit 35. By the opening of $S_1$ the integrators 30 and 40 are disconnected from the momentary deviation voltages $\epsilon$, respectively $-\epsilon$. By the closing of $S_3$ the integrated voltage of the integrator 30 is applied to two triggers 8 and 9, which control in a similar way as in FIG. 3 contacts $S_8$ and $S_9$ and which make the correction motor run in the right sense. By the closing of $S_8$ or $S_9$ the integrator 30 is discharged over the equally closed contact $S_2$, and the discharge time defines the time during which the correctfon motor is running.

The mentioned first impulse lasts about 20 sec. whereafter the contacts $S_1$, $S_2$ and $S_3$ return to the drawn position.

Immediately upon the ending of the described impulse the switching unit produces a second impulse (upper impulse in the unit 35), which changes over the contacts $S_5$, $S_6$ and $S_7$ during the following revolution. During this next revolution the integrator 40 which has just received the signal $-\epsilon$ over $R_d$, receives thereby the signal $\epsilon$ over $R_{dp}$, whereas the discharged integrator 30 receives the signal $-\epsilon$ over $R_d$.

At the end of the revolution the same operations as aforesaid are performed but now the integrator 40 is discharged whereas the integrator 30 is not discharged, but will receive the signal $\epsilon$ over $R_{dp}$ during a next revolution.

The results obtained with the just described controller were excellent in practice. The position deviations of a belt type, described in the introductory part, amounted to several centimeters when the belt was controlled according to the conventional techniques. By using the device according to the present invention the deviations were reduced to a few millimeters.

The invention is not limited to the described embodiment.

As already described in the introductory part some other forms of sensing means can be used for the edge detector. Devices other than capacitive devices are indeed required if the endless belt is made out of an electrically nonconductive material or of a material having a low dielectricity constant.

Instead of one servomotor 19 use can be made of two servomotors which each control the displacement of one bearing of the correction roller. In a suchlike arrangement preferably also a device may be provided for measuring the tension of the endless belt, e.g. a straingage measuring bridge, the measuring result of which is transmitted to the control circuit 31 so that this control circuit cannot only influence the skew positon $\epsilon$ of the correction roller but can also make this roller perform a displacement parallel to its axis. Finally the control circuit can also be controlled by a number of safety signals so that it may be prevented thereby that, e.g. at a defect of the controller, the servomotor 19 will keep on running continuously but, on the contrary, the correction action will stop above a determined skew position of the roller 12, etc.

In the foregoing embodiment the servomotor 19 was controlled by voltage impulses the period of which was determined by the time needed for discharging the integrator. It is clear that the servomotor can be controlled in other ways. E.g. the magnitude of the average position deviation signal $e_g$ of the integrator can directly define the amplitude of the voltage (more in general: the magnitude of the force which enables the displacement of the correcting member), which during a constant period is applied to a servomotor having a number of revolutions depending on the applied voltage. Finally, it is also possible to control the servomotor by voltage impulses the period and the amplitude of which are variable.

What we claim is:

1. Device for the positioning control of an endless belt comprising an edge detector which produces a position deviation signal, a correcting member for controlling the position of the belt, and a controller which receives the position deviation signal from the edge detector and which controls the correcting member, said controller comprising means for defining the average position deviation of the belt edge and means for defining the rate at which the average position deviation changes, so that the correction signal of the controller which controls the correcting member, depends on the average position deviation and on the rate of change of said average position deviation.

2. Device according to claim 1, wherein the means for defining the average position deviation of the belt edge comprises an integrator for integrating the momentary position deviations over a period of one belt revolution.

3. Device according to claim 1, wherein the means for defining the rate at which the average position deviation changes, comprises a reversing unit for defining the opposite momentary position deviation, and a change-over contact which connects the momentary position deviation signals to an integrator during one belt revolution and which connects the opposite momentary position deviation signals as determined by the reversing unit to the integrator during the next belt revolution.

4. Device according to claim 3, wherein the time constant of the integrator during the period, the momentary position deviation signals are supplied, is different from the time constant during the period the opposite momentary position deviation signals are supplied.

5. Device according to claim 4, comprising two integrators, wherein during one belt revolution the first integrator receives the momentary deviation signals and the second integrator receives the opposite momentary deviation signals, and wherein through a change-over contact during the next belt revolution the first integrator receives the opposite momentary deviation signals and the second integrator receives the momentary deviation signals.

6. Device according to claim 5, wherein the change-over contacts are controlled by a switching unit which is itself controlled by a revolution switch which is actuated for a short while at each belt revolution, and which after each belt revolution switches over the change-over contacts.

7. Device according to claim 6, wherein the switching unit controls also contacts for discharge an integrator after one belt revolution.

8. Device according to claim 7, wherein also contacts are provided which disconnect the signal of the momentary position deviation from the input of an integrator during the discharging thereof.

9. Device according to claim 7, wherein the time during which the switching unit controls the contacts for discharging and disconnecting the input of an integrator, is only a fraction of the period of one belt revolution.

10. Device according to claim 9, wherein measuring means is provided for measuring the time which is necessary for discharging an integrator.

11. Device according to claim 10, wherein said measuring means is formed by two triggers.

12. Device according to claim 11, wherein a controlling circuit is provided which is controlled by the measuring means and which makes the correcting member operate during the discharging of the integrator.

References Cited

UNITED STATES PATENTS

| | | | |
|---|---|---|---|
| 2,075,111 | 3/1937 | Gulliksen | 74—241 XR |
| 2,117,878 | 5/1938 | Friedemann | 74—241 XR |
| 2,294,996 | 9/1942 | Mercier | 74—241 |
| 2,356,567 | 8/1944 | Cockrell | 74—241 XR |
| 2,600,273 | 6/1952 | Seifried | 74—241 |
| 3,117,462 | 1/1964 | Davis | 74—241 |

JAMES A. WONG, Primary Examiner